(12) United States Patent
Muckelmann et al.

(10) Patent No.: US 6,374,610 B2
(45) Date of Patent: Apr. 23, 2002

(54) SECONDARY AIR FAN FOR AN INTERNAL COMBUSTION ENGINE

(75) Inventors: Klaus Muckelmann, Hilden; Thomas Rosgen, Grevenbroich, both of (DE)

(73) Assignee: Pierburg AG, Neuss (DE)

( * ) Notice: Subject to any disclaimer, the term of this patent is extended or adjusted under 35 U.S.C. 154(b) by 0 days.

(21) Appl. No.: 09/849,301

(22) Filed: May 4, 2001

(30) Foreign Application Priority Data

May 6, 2000 (DE) .......................................... 100 22 208

(51) Int. Cl.[7] ................................................ F02B 33/44
(52) U.S. Cl. .......................... 60/605.1; 60/611; 417/43; 417/44.1; 417/63
(58) Field of Search ................................ 60/605.1, 611; 417/423.14, 423.15, 424.1, 424.2, 43, 44.1, 63

(56) References Cited

U.S. PATENT DOCUMENTS

| 4,817,387 A | * | 4/1989 | Lashbrook | 60/611 |
| 4,955,785 A | * | 9/1990 | Cohen | 415/26 |
| 4,998,951 A | * | 3/1991 | Kawamura | 60/608 |
| 5,484,266 A | * | 1/1996 | Murga | 417/44.1 |
| 5,667,362 A | * | 9/1997 | Murai et al. | 417/44.1 X |
| 5,931,144 A | * | 8/1999 | Firey | 123/681 |

* cited by examiner

*Primary Examiner*—Hoang Nguyen
(74) *Attorney, Agent, or Firm*—Ladas & Parry

(57) ABSTRACT

A secondary air fan for an internal combustion engine includes a housing in which a motor unit drives a pump unit, the housing having an air inlet channel and an air outlet channel, an air mass sensor, being arranged in one of the channels to control the motor unit by an electronic unit. The air mass sensor is connected to the electronic unit which is attached to the housing and/or to the air inlet channel or to the air outlet channel.

5 Claims, 2 Drawing Sheets

SECONDARY AIR FAN FOR AN INTERNAL COMBUSTION ENGINE

BACKGROUND OF THE INVENTION

The invention relates to a secondary air fan for an internal combustion engine in which a motor unit and a pump unit driven by the motor unit are arranged in a housing. The housing has an air inlet channel, an air outlet channel and an air mass sensor arranged in one of the channels for regulating the motor unit by an electronic means.

Secondary air fans of this type are known for post-oxidizing uncombusted fuel components during cold starting of the engine by forced air flow into the exhaust gases to minimize discharge of pollutants into the atmosphere. An air mass sensor supplies an actual instantaneous value of the air mass flow and the instantaneous value is supplied to an electronic unit connected, on one side, to the motor of the secondary air fan and, on another side, to an over-riding computer unit, for example, an engine control unit. The wiring cables of the air mass sensor and of the fan motor to the electronic unit have a disadvantage in the known construction, since the cables cause an increased expenditure for assembly and also the cables are very sensitive to disruption. Furthermore, the electronic unit requires room for assembly.

SUMMARY OF THE INVENTION

An object of the invention is to provide a secondary air fan, which avoids the above disadvantages.

This object is achieved according to the invention by arranging the air mass sensor, at the electronic unit and attaching the electronic unit to the housing and/or to the air inlet or air outlet channel.

In this way, the wiring of the air mass sensor to the electronic unit is not necessary. In addition, by introducing the electronic unit in the region of one of the air channels, a cooling of the electronic unit is automatically obtained.

It is particularly advantageous if the parts of the electronic unit to be cooled, are located behind the air mass sensor, in the direction of air flow, so that the air mass flow is not influenced by heat exchange.

Furthermore, due to the construction of the invention, the electronic unit does not require any additional room for its assembly.

DETAILED DESCRIPTION OF THE INVENTION

Figure 1:
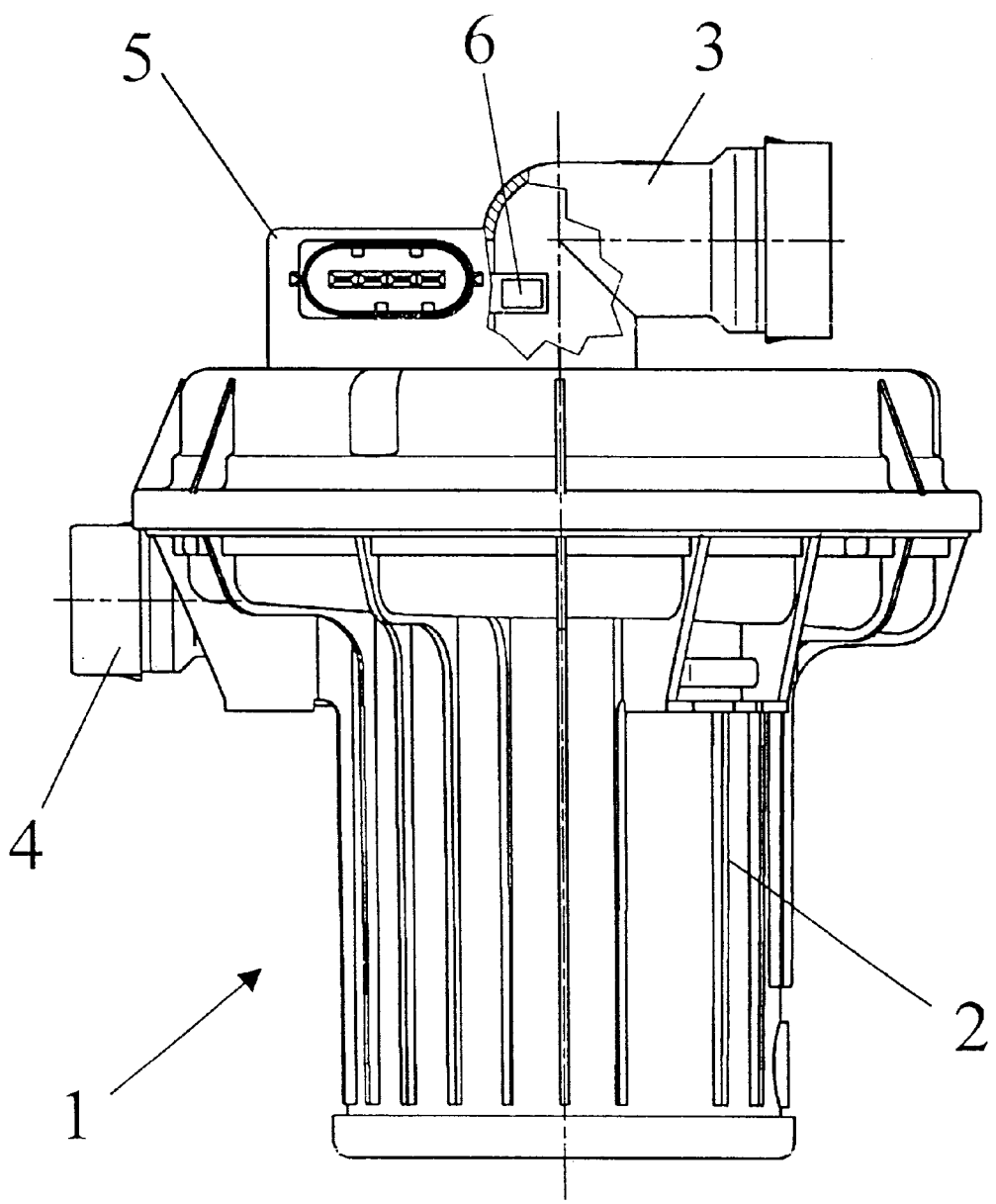
FIG. 1 is a side view of a first embodiment of a secondary air fan assembly according to the invention in which the air channel is partially broken away.

FIG. 1 shows a secondary air fan 1 according to the invention. The secondary air fan includes a conventional motor (not shown) mounted in a housing 2 and a conventional pump driven by the motor. The housing has an air inlet channel 3 and an air outlet channel 4. As well known, atmospheric air is suctioned at channel 3 and pumped out from channel 4.

An electronic unit 5 is attached to the air inlet channel 3, for example, by means of an adhesive, and an air mass sensor 6 is connected to the electronic unit 5 and projects into the air inlet channel 3. The sensor 6 extends into the channel 3 through a hole in the channel which is sealed.

This arrangement of the electronic unit 5 with air mass sensor 6 attached thereto makes possible a particularly simply constructed secondary air fan 1 which is insensitive to disruptions, and in which the electronic unit 5 does not require any additional room for its assembly. Furthermore, the electronic unit 5 and the air sensor 6 are cooled by the air mass flow through air inlet channel 3.

Figure 2:
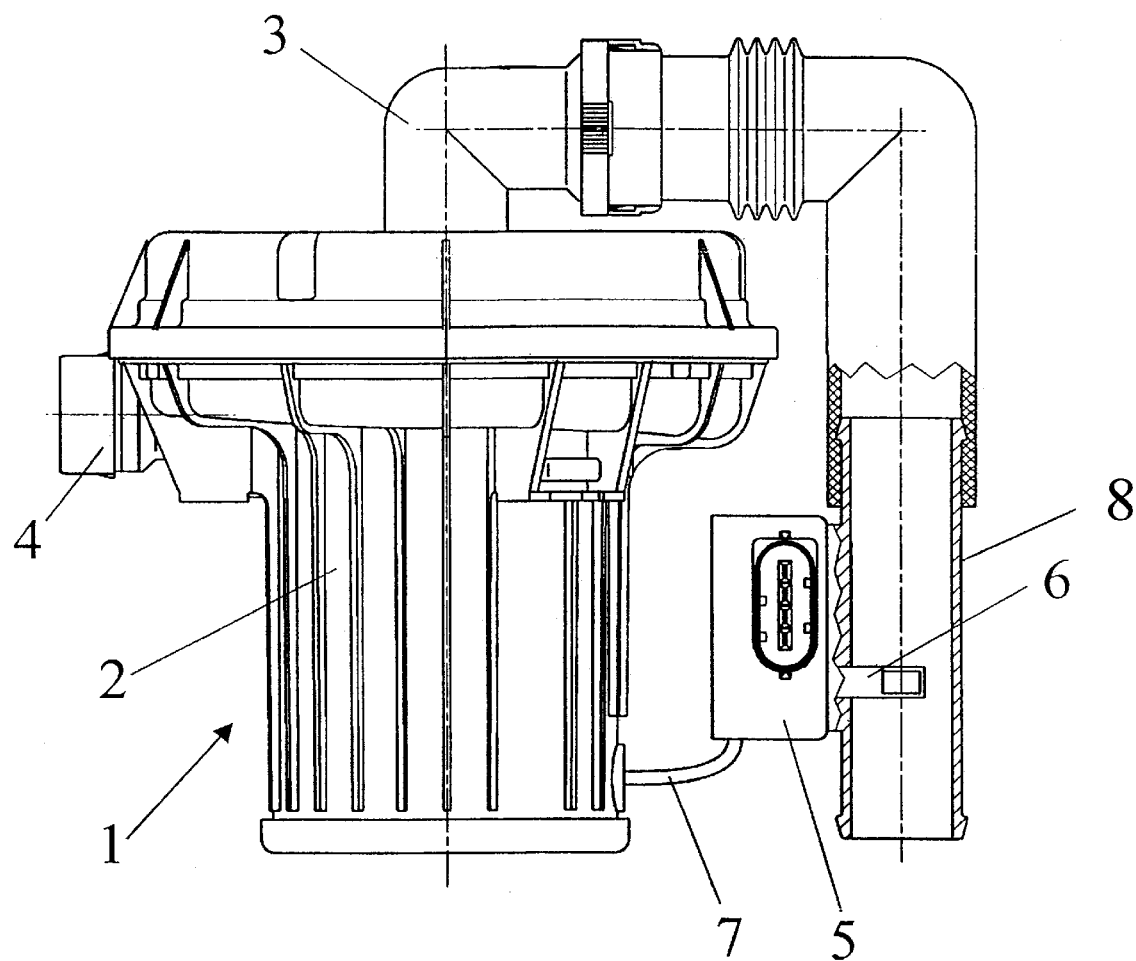
FIG. 2 shows a second embodiment of the secondary air fan according to the invention.

FIG. 2 shows a second embodiment of the secondary air fan according to the invention. The same reference numerals will be used to designate the same elements as in FIG. 1. In the embodiment of FIG. 2 the air fan 1' is constructed so that the electronic unit 5 utilizes the space between housing 2 and air inlet channel 3 for its assembly. In this regard, the air inlet channel 3 is provided with a downward extension 8 disposed adjacent to housing 1 to provide a space therewith for assembly of the electronic unit 5 therein. As in the embodiment in FIG. 1, the electronic unit 5 can be mounted by an adhesive in this case to the extension 8 of the air inlet channel 3. In this embodiment, the electronic unit 5 is mounted on an outside surface of the extension 8 and the air sensor 6 extends through a hole in the extension 8 so as to project into the air flow in the air inlet channel 3. The electronic unit 5 connected to the motor of the secondary air fan by an outside cable 7. In this embodiment, the electronic unit 5 is downstream of the sensors 6 in order not to influence it by heat exchange with the unit 5.

Although the invention is disclosed with reference to particular embodiments thereof, it will become apparent to those skilled in the art that numerous modifications and variations can be made which will fall within the scope and spirit of the invention as defined by the attached claims.

What is claimed:

1. A secondary air fan for an internal combustion engine, said secondary air fan comprising:

a housing for a motor and a pump driven by the motor, said housing having an air inlet channel and an air outlet channel arranged to provide air flow through the housing by said pump, and an electronic unit including an air mass sensor arranged in one of said channels for sensing air flow therein to control said motor, said electronic unit being attached to said housing, said air mass sensor being incorporated with said electronic unit and projecting into the air flow in said one air channel.

2. The secondary air fan of claim 1, wherein the electronic unit is externally attached to the housing and said air mass sensor extends through a hole in the housing and projects into the air flow in said one air channel.

3. The secondary air fan of claim 2, wherein said electronic unit is adhesively attached to the housing.

4. The secondary air fan of claim 1, wherein the air inlet channel includes an extension disposed adjacent to the motor, said electronic unit being externally mounted on said extension in a space between the extension and the motor and being electrically connected by a cable to the motor.

5. The secondary air fan of claim 1, wherein said one air channel is said air inlet channel.

* * * * *